United States Patent Office

3,431,117
Patented Mar. 4, 1969

3,431,117
PRODUCT AND PROCESS FOR PREPARING
FROZEN WHIPPED TOPPING COMPOSITION
George John Lorant, Scarborough, N.Y., assignor to
General Foods Corporation, White Plains, N.Y.,
a corporation of Delaware
No Drawing. Filed Oct. 29, 1965, Ser. No. 505,739
U.S. Cl. 99—139                                  8 Claims
Int. Cl. A23l *1/14;* A23g *5/00*

ABSTRACT OF THE DISCLOSURE

A frozen whipped topping comprising fat, protein, emulsifier, stabilizer and water is prepared by homogenization of the mix of ingredients at pressures above 6000 p.s.i., followed by whipping and freezing the homogenized mix; the topping is characterized by its stability both upon thawing and refrigerated storage.

---

This invention relates to a process for preparing a whipped topping composition. More particularly, it relates to a process for preparing a frozen whipped topping composition suitable for use as a whipped cream substitute and as a topping for desserts, icing for cakes, and the like.

Powdered compositions for use in preparing whipped toppings are known. Such compositions offer advantages of ease of handling due to their free flowing character and freedom from spoilage on storage for long periods of time. However, the recipe for such powdered whippable compositions call for reconstitution of the powdered whippable composition with water and/or milk and whipping thereby resulting in certain of the convenience features which such products offer being lost.

In addition to powdered whippable topping compositions, edible emulsions which are adapted to be whipped or aerated with an inert edible gas are also known and these emulsions are adapted to be distributed and sold in a refrigerated condition. Such emulsions may be packaged in and dispensed from the familiar aerosol cans utilizing the inert gas as both aerating agent and propelling agent. Alternatively, such emulsions may be distributed and sold like many frozen or liquid dairy products and, at the time of use, such emulsions are whipped or aerated. It is apparent, however, that such emulsions, i.e., refrigerated whippable topping mixes, also leave much to be desired. Thus, in the case of emulsions of the former type which are adapted to be dispensed from a pressurized container, the cost and poor stability at room temperature of such products limits wide acceptability. Further, the convenience feature is missing from those refrigerated topping mixes of the latter type since they must be later whipped or aerated with a mechanical means. Moreover, many refrigerated topping mixes of the latter type have poor storage stability even under optimum refrigeration conditions.

Therefore, it is an object of the present invention to provide an improved process for preparing a whipped topping composition.

A further object of the present invention is to provide a process for preparing a whipped topping composition, which composition does not suffer from most of the disadvantages which are apparent in conventionally prepared refrigerated topping mixes.

A still further object of the present invention is to provide a process for preparing a frozen whipped topping having superior freeze-thaw stability and excellent storage stability.

In accordance with the present invention, it has now been discovered that a frozen whipped topping can be prepared by blending fat, protein, emulsifier, stabilizer, and water to form a mix, homogenizing the mix at a pressure above about 6000 p.s.i., cooling the emulsion, whipping the emulsion, and freezing the emulsion. Advantageously, carbohydrate, flavor, etc. are incorporated after cooling and prior to whipping. The compositions so prepared are characterized by their excellent volume, texture, and eating properties as well as their having superior storage stability and their offering a maximum of convenience to the consumer.

The process of the present invention thus makes it possible, for the first time, to offer whipped topping compositions which are distributed and sold in a frozen state and, upon thawing, retain their excellent volume, texture and eating properties. The thawed compositions may then be stored at household refrigeration temperatures for periods of up to fourteen to twenty-one days, again, without an apparent loss in volume, texture or eating properties. Thus, the compositions may be described as having exceptional stability during freezing, thawing and storage at refrigeration temperatures. In this connection, it may be noted that whipped cream which is considered to be the standard against which many powdered whippable compositions and refrigerated topping mixes are evaluated is characterized by poor freeze-thaw stability as well as its instability at refrigeration temperatures after a period of, say, about three to four days.

The fat employed in preparing the frozen whipped topping compositions can be any of the natural animal or vegetable fats or oils commonly employed in food products. Thus, any combination of edible oils, semi-solid or solid fats, can be employed. Such fats or oils may be fully or partially hydrogenated. Suitable fats include lard, modified lard, margarine, as well as various vegetable and animal oils. Thus, oils such as coconut oil, palm kernel oil, cottonseed oil, peanut oil, olive oil, corn oil, and the like, may be utilized. Preferably, the fat is low melting and has desired melt-away characteristics at mouth temperatures.

The protein which may be employed may be any of a large group including non-fat milk solids, water soluble soy protein derivatives, egg albumen, gelatin, sodium caseinate, calcium caseinate, and the like, and mixtures thereof. The protein apparently serves to effect stabilization of the whipped topping composition.

A wide variety of emulsifiers may be employed in the compositions which are prepared by the process of this invention. Thus, hydroxylated lecithin, mono- or di-glycerides of fatty acids such as monostearin and dipalmitin, polyoxyalkylene ethers of fatty esters of polyhydric alcohols such as the polyoxyethylene ethers of sorbitan monostearate or the polyoxyethylene ethers of sorbitan distearate; fatty esters of polyhydric alcohols, such as sorbitan monostearate; mono- and di-esters of glycols and fatty acids such as propylene glycol monostearate and propylene glycol monopalmitate; and partial esters of carboxylic acids such as lactic, citric, and tartaric acids with the mono- and di-glycerides of fatty acids such as glyceryl lactopalmitate and glyceryl lactooleate. The fatty acids employed in the preparation of the emulsifiers include those derived from beef tallow and coconut, cottonseed, palm, peanut, soybean and marine oils. Preferably, a combination of emulsifiers is employed, typically, polyoxyethylene sorbitan monostearate and sorbitan monostearate.

Stabilizer, other than protein, is also desirably included in the frozen whipped topping composition. Such stabilizer is preferably a natural, i.e., vegetable, or synthetic gum and may be, for example, carrageenin, guar gum, alginate, and the like or carboxymethylcellulose, methylcellulose ether and the like, and mixtures thereof.

Carbohydrate is employed in the frozen whipped topping composition to provide desired sweetness. Thus, sugars such as sucrose, dextrose, fructose, lactose, maltose, invert sugar, and mixtures thereof may be utilized.

Other ingredients which may be included in the frozen whipped topping compositions prepared by the process of this invention are flavoring agents, colorants or dyes, vitamins, minerals, and the like. Suitable flavoring agents include vanilla, chocolate, coffee, maple, spice, mint, butter, caramel and fruit flavors.

The amounts of fat, protein, emulsifier, stabilizer, carbohydrate, and optionally included ingredients as well as the amount of water employed in the preparation of frozen whipped topping compositions according to the process of this invention can be varied over relatively wide limits. Indeed, a surprising finding of the present invention is that homogenization of the composition using a pressure of at least 6000 p.s.i. allows considerable latitude in the amounts of ingredients employed. The amount of fat will be sufficient to provide a stable whipped topping which has good mouth feel and yet, upon melting, does not leave an undesirable film on the palate. Sufficient amounts of protein, emulsifier and stabilizer will be used to afford some stability to the topping and to impart good whipping properties to the composition. Further, the amount of carbohydrate will be varied over a range sufficient to provide desired sweetness level in the finished topping composition. A preferred range of ingredients is as follows.

| Ingredients: | Percent by weight |
|---|---|
| Fat | 20.0–30.0 |
| Protein | 0.5–2.0 |
| Emulsifier | 0.5–2.0 |
| Stabilizer (gum) | 0.5–2.0 |
| Water | 40.0–60.0 |
| Carbohydrate (sugar) | 20.0–30.0 |
| Flavoring agent | 0.5–2.0 |
| Colorant | 0.01–0.05 |

As has been indicated previously, the ingredients, except for carbohydrate and the optionally included ingredients, such as flavoring agent and color are blended in suitably desirable ratios to form a mix. The ingredients are heated prior to or during blending and the mix is then passed through a homogenizer of the typical dairy type. Although homogenization may be accomplished in one stage, for best results, homogenization is carried out in two stages, operated with the pressure maintained during the first stage at a minimum of 6000 p.s.i. and a maximum of about 10,000 p.s.i., preferably about 7500 p.s.i., and the second stage at a pressure of about 500 p.s.i. The mix temperature is usually maintained at a temperature of about 110° to 160° F., during homogenization. Carbohydrate and the optionally included ingredients may be added either before or after the mix has been homogenized to form an emulsion. The emulsion is then cooled to about 35° to 75° F. and passed through a whipper for the incorporation of air or an inert gas such as nitrogen, carbon dioxide, nitrous oxide or the like. The whipper may be of conventional construction such as a Votator heat exchanger that permits cooling of the emulsion during whipping to temperatures of about 35° to 50° F. The emulsion is then whipped to about 250% overrun and is packaged and frozen.

The process of the present invention thus produces frozen whipped topping compositions which remain smooth after several freeze-thaw cycles and which do not curdle upon prolonged refrigerator storage. While the compositions are distributed and sold in the frozen state, it is apparent that they may be also merchandised in a refrigerated condition without loss of the advantageous features afforded by this invention. To use the frozen whipped topping composition, the product is defrosted, for example, by being left overnight in the refrigerator or left out at room temperature for two hours. The compositions after thawing are thus ready for immediate table use without the necessity for reconstitution or for whipping.

In order to illustrate the present invention but in no manner to restrict it, the following example is given:

EXAMPLE I.—INGREDIENTS

| | Weight, gms. | Percent |
|---|---|---|
| Fat (hydrogenated vegetable) | 79.9 | 25.77 |
| Protein (sodium caseinate) | 3.525 | 1.14 |
| Stabilizer (carrageenan and guar gum) | 2.35 | 0.76 |
| Emulsifier (polyoxyethylene (20) sorbitan monostearate) | 2.115 | 0.68 |
| Emulsifier (sorbitan monostearate) | 0.846 | 0.27 |
| Flavor | 0.00035 | 0.00011 |
| Colorant (beta carotene) | 0.0987 | 0.032 |
| Water | 146.170 | 47.15 |
| Carbohydrate (sugar) | 70.000 | 22.60 |
| Flavor (vanilla) | 5.000 | 1.61 |
| | 310.00505 | 100.012 |

Process (1) Heat water and fat to 160° F.
(2) Add sodium caseinate to (1) and mix.
(3) Melt emulsifiers and stabilizer at 120° F. and add to (1).
(4) Add flavor and color to (1).
(5) Add sugar and vanilla to (1).
(6) Pass hot mix through 2-stage homogenizer—1st stage, 7500 p.s.i.; 2nd stage, 500 p.s.i.
(7) Continuously cool homogenized mix over rib cooler to 60–65° F.
(8) Batch cool to 44° F.
(9) Whip to 250% overrun (1 cup=3½ cups whip)
(10) Package.
(11) Freeze.

The composition so prepared is characterized by its excellent freeze-thaw stability even after several cycles. The stability of the thawed whipped composition is judged superior upon storage for 14–21 days at refrigerator temperatures. Exceptional retention of volume and textural characteristics of the thawed whipped composition is also observed.

It will be apparent that alterations, modifications and substitutions in the materials and conditions set forth hereinbefore will be obvious to those skilled in this art. Such obvious alterations, modifications and substitutions are deemed to be included within the scope of the present invention, which is limited only by the following appended claims.

What is claimed is:

1. A process for preparing a frozen whipped topping composition in the form of an emulsion and having improved stability upon thawing and refrigerated storage comprising the steps of:
  (1) blending fat, protein, emulsifier, stabilizer, and water to form a mix;
  (2) homogenizing said mix to form an emulsion at a pressure of at least 6000 p.s.i.;
  (3) cooling said emulsion;
  (4) whipping said emulsion; and
  (5) freezing said emulsion.

2. The process of claim 1 in which said homogenizing step is carried out in two stages, the first of said stages being carried out at a pressure of 6000 to 10,000 p.s.i. and the second of said stages being carried out at a pressure of about 500 p.s.i.

3. The process of claim 2 further comprising adding carbohydrate and a flavoring agent to said mix prior to said homogenizing step.

4. The process of claim 2 further comprising adding carbohydrate and a flavoring agent to said emulsion subsequent to said cooling step and prior to said whipping step.

5. The process of claim 4 in which said blending and homogenizing steps are carried out at about 110° to 160° F., and said cooling and whipping steps are carried out at about 35° to 75° F.

6. In a process for preparing a frozen whipped topping composition in the form of an emulsion wherein the composition is whipped and frozen, the improvement which consists in homogenizing the emulsion ingredients prior to whipping and freezing thereof at a pressure of at least 6000 p.s.i.

7. The process of claim 6 in which said homogenizing is carried out in two stages, the first of said stages being carried out at a pressure of 6,000 to 10,000 p.s.i. and the second of said stages being carried out at a pressure of about 500 p.s.i.

8. A composition prepared by the process of claim 1.

References Cited

UNITED STATES PATENTS

| | | | |
|---|---|---|---|
| 2,868,653 | 1/1959 | Diamond et al. | 99—139 |
| 2,970,918 | 2/1961 | Petersen | 99—139 |
| 3,010,830 | 11/1961 | Berndt et al. | 99—139 X |

OTHER REFERENCES

Tressler et al.: "The Freezing Preservation of Foods," vol. II, 1957, The Avi Publishing Co., Inc., Westport, Conn., pp. 250 to 252.

Sommer: "The Theory and Practice of Ice Cream Making," sixth ed., 1951, published by the author, Madison, Wis., pp. 144 to 145.

A. LOUIS MONACELL, *Primary Examiner.*

J. M. HUNTER, *Assistant Examiner.*